US008761978B2

(12) United States Patent
King

(10) Patent No.: US 8,761,978 B2
(45) Date of Patent: Jun. 24, 2014

(54) SYSTEM FOR SUPPLYING PROPULSION ENERGY FROM AN AUXILIARY DRIVE AND METHOD OF MAKING SAME

(75) Inventor: Robert Dean King, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 217 days.

(21) Appl. No.: 13/069,533

(22) Filed: Mar. 23, 2011

(65) Prior Publication Data

US 2012/0245772 A1 Sep. 27, 2012

(51) Int. Cl.
| | |
|---|---|
| B60W 20/00 | (2006.01) |
| B60L 15/20 | (2006.01) |
| B60L 1/00 | (2006.01) |
| H05K 13/00 | (2006.01) |
| B60W 10/08 | (2006.01) |
| B60W 10/06 | (2006.01) |

(52) U.S. Cl.
USPC ....... 701/22; 180/65.265; 903/930; 307/10.1; 29/592.1

(58) Field of Classification Search
CPC ............ Y02T 10/7225; Y02T 10/7233; Y02T 10/7077; Y02T 10/7241; Y02T 10/70; B60L 15/20; B60L 2240/529; B60L 11/126; H02J 2001/106; H02J 1/14; B60W 10/30; B60W 10/08; B60W 20/00; B60K 6/20
USPC ........................... 318/139; 903/907; 180/65.1
See application file for complete search history.

(56) References Cited

U.S. PATENT DOCUMENTS

| | | | | |
|---|---|---|---|---|
| 5,134,355 A | * | 7/1992 | Hastings | 323/211 |
| 5,214,358 A | * | 5/1993 | Marshall | 318/139 |
| 5,373,195 A | * | 12/1994 | De Doncker et al. | 307/45 |
| 5,589,743 A | * | 12/1996 | King | 318/139 |
| 5,601,741 A | * | 2/1997 | Thommes | 219/137 PS |
| 5,636,106 A | * | 6/1997 | Batarseh et al. | 363/16 |
| 5,710,699 A | | 1/1998 | King et al. | |
| 5,780,980 A | * | 7/1998 | Naito | 318/139 |
| 5,898,282 A | * | 4/1999 | Drozdz et al. | 318/139 |
| 5,939,794 A | * | 8/1999 | Sakai et al. | 290/40 A |
| 5,939,848 A | * | 8/1999 | Yano et al. | 318/139 |
| 5,941,328 A | * | 8/1999 | Lyons et al. | 180/65.1 |
| 5,949,658 A | * | 9/1999 | Thottuvelil et al. | 363/15 |
| 6,002,103 A | * | 12/1999 | Thommes | 219/130.21 |
| 6,023,137 A | * | 2/2000 | Kumar et al. | 318/400.27 |
| 6,239,407 B1 | * | 5/2001 | Thommes | 219/130.21 |
| 6,484,830 B1 | * | 11/2002 | Gruenwald et al. | 180/65.245 |

(Continued)

Primary Examiner — John R Olszewski
Assistant Examiner — Jean-Paul Cass
(74) Attorney, Agent, or Firm — Ziolkowski Patent Solutions Group, PC; Jean K. Testa

(57) ABSTRACT

A propulsion system is provided that includes an energy system, an auxiliary system, and a system controller. The energy system includes a bi-directional boost converter coupled to a direct current (DC) link and comprising a plurality of input channels. The energy system also includes a first energy storage device coupled to a first input channel of the bi-directional boost converter via a DC bus. The auxiliary system is coupled to the energy system and includes an auxiliary energy source, an auxiliary load, and an auxiliary load controller coupled to the auxiliary energy source and to the auxiliary load. The system controller is configured to cause the auxiliary load controller to reduce a power draw of the auxiliary load from the auxiliary energy source and to cause the bi-directional boost converter to boost a voltage supplied by the auxiliary energy source and to supply the boosted voltage to the DC link.

21 Claims, 6 Drawing Sheets

(56) References Cited

U.S. PATENT DOCUMENTS

| | | | |
|---|---|---|---|
| 6,538,400 B2 * | 3/2003 | Fowler et al. | 318/34 |
| 6,651,759 B1 * | 11/2003 | Gruenwald et al. | 180/65.245 |
| 6,849,827 B2 * | 2/2005 | Thommes | 219/130.21 |
| 7,049,546 B2 * | 5/2006 | Thommes | 219/130.21 |
| 7,049,792 B2 | 5/2006 | King | |
| 7,319,206 B2 * | 1/2008 | Thommes | 219/130.1 |
| 7,543,454 B2 * | 6/2009 | Harris | 62/115 |
| 7,568,537 B2 * | 8/2009 | King | 180/65.1 |
| 7,642,755 B2 * | 1/2010 | Bartilson | 320/167 |
| 7,723,932 B2 * | 5/2010 | King et al. | 318/139 |
| 7,866,425 B2 * | 1/2011 | King et al. | 180/65.31 |
| 7,960,855 B2 * | 6/2011 | King et al. | 307/10.1 |
| 7,960,857 B2 * | 6/2011 | King | 307/10.1 |
| 8,013,548 B2 * | 9/2011 | King et al. | 318/139 |
| 8,026,638 B2 * | 9/2011 | King et al. | 307/77 |
| 8,051,932 B2 * | 11/2011 | Park | 180/65.21 |
| 8,154,149 B2 * | 4/2012 | King | 307/9.1 |
| 8,600,590 B2 * | 12/2013 | Frazier et al. | 701/19 |
| 2005/0284676 A1 * | 12/2005 | King et al. | 180/65.3 |
| 2006/0066270 A1 * | 3/2006 | Kumagai et al. | 318/139 |
| 2008/0234897 A1 * | 9/2008 | Tsuchida | 701/42 |
| 2010/0051291 A1 * | 3/2010 | Marcu | 166/374 |
| 2010/0133912 A1 * | 6/2010 | King et al. | 307/82 |
| 2010/0276993 A1 * | 11/2010 | King | 307/9.1 |
| 2011/0068740 A1 * | 3/2011 | Ang | 320/109 |
| 2013/0239845 A1 * | 9/2013 | Frazier et al. | 105/27 |
| 2013/0240678 A1 * | 9/2013 | Frazier et al. | 246/186 |
| 2013/0245863 A1 * | 9/2013 | Frazier et al. | 701/19 |

* cited by examiner

SYSTEM FOR SUPPLYING PROPULSION ENERGY FROM AN AUXILIARY DRIVE AND METHOD OF MAKING SAME

BACKGROUND

Embodiments of the invention relate generally to vehicle drive systems and, more specifically, to providing propulsion power from an auxiliary drive of a vehicle or non-vehicle system.

Electric vehicles and hybrid electric vehicles are typically powered by one or more energy storage devices, either alone or in combination with an internal combustion engine. In pure electric vehicles, the one or more energy storage devices powers the entire drive system, thereby eliminating the need for an internal combustion engine. Hybrid electric vehicles, on the other hand, include energy storage device power to supplement power supplied by an internal combustion engine, which greatly increases the fuel efficiency of the internal combustion engine and of the vehicle. Traditionally, the energy storage devices in electric or hybrid electric propulsion systems include batteries, ultracapacitors, flywheels, or a combination of these elements in order to provide sufficient energy to power an electric motor.

In some applications, an auxiliary drive is provided in addition to the propulsion system to operate auxiliary equipment. Such applications may include, for example, medium duty (MD) and heavy duty (HD) applications, including transit buses, trucks, light rail and other industrial equipment. Often, a reduction in cost, size, weight, and improved subsystem and component packaging plus improved system efficiency results by powering auxiliaries by a separate engine driven alternator or auxiliary power unit (APU) to produce electrical power to operate auxiliaries such as air conditioning components including Freon compressors, pumps, fans and heaters. In other potential applications the auxiliaries may be powered by a fuel cell. The electrical power produced may be alternating current (AC) power or direct current (DC) power. Motor driven auxiliary loads may be operated at a constant speed and frequency or operate at a variable speed by control of the electrical output frequency and voltage of the APU.

For additional control, subsystem components such as in an air conditioning unit, for example, are often operated in an on/off mode based on the level of temperature needed. Typically, the power rating of the APU is designed to handle the maximum load of all the auxiliary loads. Since not all auxiliary loads will be powered all the same time, typical APU systems operate at partial load with less than optimum efficiency.

Therefore, it is desirable to provide an electric and/or hybrid electric propulsion system allowing the excess power capability of the APU to be utilized to provide a portion of the propulsion load of the traction or propulsion drive system. In addition, it is desirable to direct a portion of the regenerative energy to power auxiliary loads during periods of deceleration instead of dissipating this energy in conventional brake systems. Alternatively, a portion of this regenerative energy can be used to partially recharge the energy storage system.

BRIEF DESCRIPTION OF THE INVENTION

In accordance with one aspect of the invention, a propulsion system includes an energy system, an auxiliary system, and a system controller. The energy system includes a bi-directional boost converter coupled to a direct current (DC) link, the bi-directional boost converter comprising a plurality of input channels. The energy system also includes a first energy storage device coupled to a first input channel of the bi-directional boost converter via a DC bus. The auxiliary system is coupled to the energy system and includes an auxiliary energy source, an auxiliary load, and an auxiliary load controller coupled to the auxiliary energy source and to the auxiliary load. The system controller is configured to cause the auxiliary load controller to reduce a power draw of the auxiliary load from the auxiliary energy source and to cause the bi-directional boost converter to boost a voltage supplied by the auxiliary energy source and to supply the boosted voltage to the DC link.

In accordance with another aspect of the invention, a method of assembling a propulsion energy system includes coupling an energy system to a direct current (DC) link, the energy system including a multi-channel bi-directional boost converter coupled to the DC link and an energy storage device coupled to a first input channel of the bi-directional boost converter via a DC bus. The method also includes coupling an auxiliary system to the energy system that includes an energy source, a load controller coupled to the energy source, and a load coupled to the load controller. The method also includes coupling a controller to the energy system and to the auxiliary system and configuring the controller to cause a reduction in power draw of the load of the auxiliary system from the energy source of the auxiliary system and to cause the DC link to receive a boosted voltage from the multi-channel bi-directional boost converter based on the reduction in power draw.

In accordance with another aspect of the invention, a vehicle system includes a direct current (DC) energy storage device coupled to a first channel of a bi-directional DC-DC boost converter, and an auxiliary energy source coupled to a first load controller and to a second channel of the bi-directional DC-DC boost converter. The vehicle system also includes a first auxiliary load coupled to the first load controller and a vehicle system controller. The vehicle system controller is programmed to reduce a load energy supplied by the auxiliary energy source to the first auxiliary load from a first energy value to a second energy value and to boost at least a portion of the reduced energy via the bi-directional DC-DC boost converter for supply thereof to a DC link.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Figure 1:
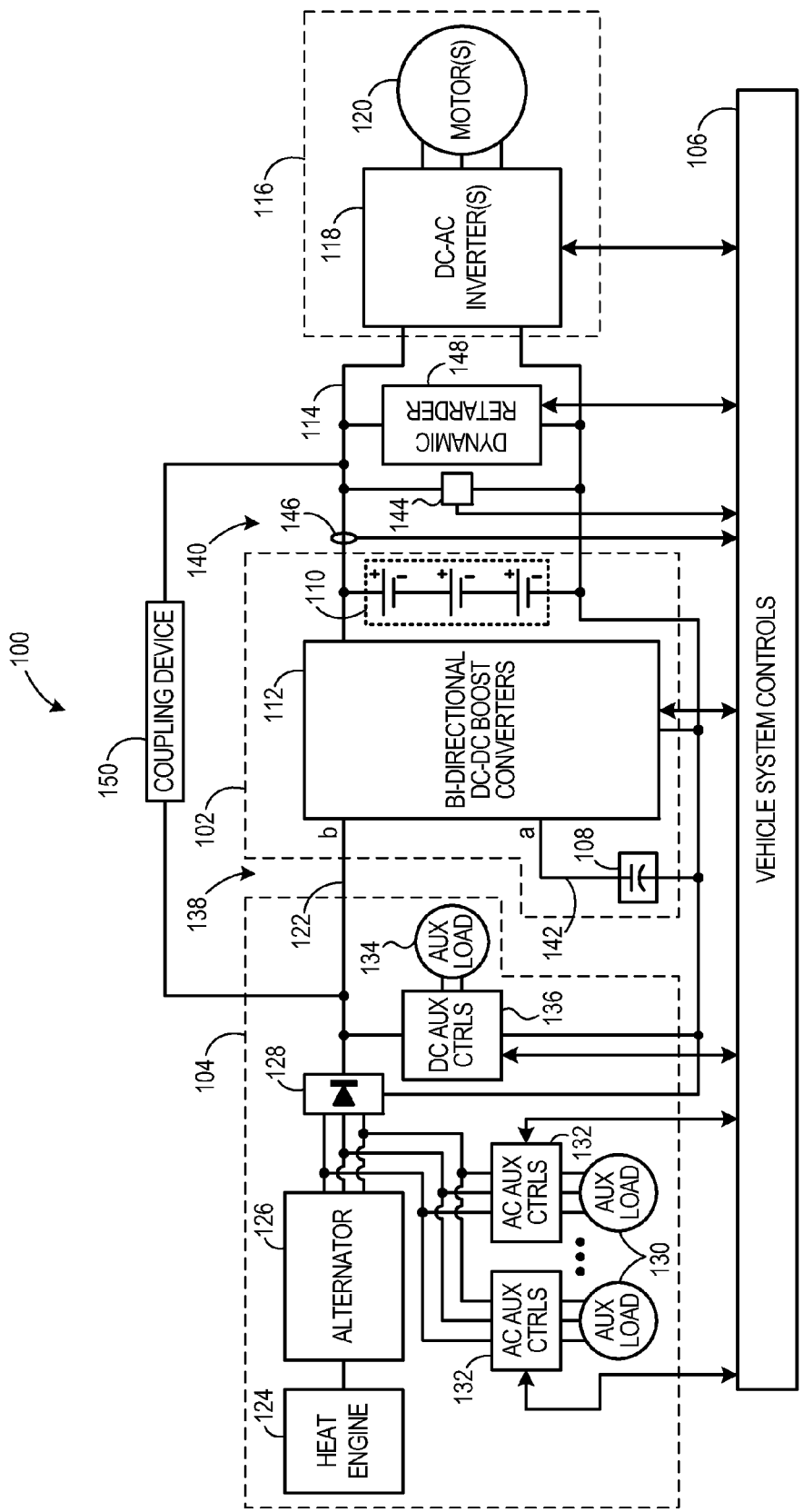
FIG. 1 schematically illustrates an embodiment of the propulsion system according to the invention.

FIG. 1 illustrates a propulsion system 100 according to an embodiment of the invention. Propulsion system 100 may be used in vehicle applications. Vehicle propulsion system 100 includes, in part, an energy system 102, an auxiliary energy system 104, and a vehicle system controller 106. Energy system 102 includes a first energy storage device 108, a second energy storage device 110, and a boost converter assembly 112 having multiple input channels coupled to respective bi-directional DC-DC boost converters. While first energy storage device 108 is illustrated as an ultracapacitor, another type of energy storage devices such as a battery, a fuel cell, a flywheel, or the like is also contemplated. First energy storage device 108 is a low-voltage, high-energy storage device coupled via a DC link 114 to an electric drive 116 including a DC-AC inverter 118 and a motor 120. Motor 120 is preferably an AC motor, but is not limited as such. Second energy storage device 110 is configured to provide a higher power than first energy storage device 108 and to transfer electrical power or energy to DC link 114 and, in turn, to first energy storage device 108 via bi-directional boost converter 112. While second energy storage device 110 is illustrated as a battery, another type of energy storage devices such as an ultracapacitor, a fuel cell, a flywheel, or the like is also contemplated. While not shown, it is to be understood that each of a plurality of motors 120 may be coupled to a respective wheel or that each motor 120 may be coupled to a differential for distributing rotational power to the wheels.

According to the embodiment illustrated in FIG. 1, auxiliary energy system 104 is coupled to a second channel (b) of bi-directional boost converter 112 via a low-side bus 122. Auxiliary energy system 104 includes a heat engine (or internal combustion engine) 124 coupled to an engine-driven alternator 126. Alternator 126 converts mechanical energy received from heat engine 124 into AC power or energy and supplies the AC power or energy to a rectifier assembly 128 configured to convert the AC power or energy into DC power or energy for supply to bus 122. Alternatively, although not shown, a fuel cell could replace the heat engine 124 and alternator 126.

Auxiliary energy system 104 includes one or more AC auxiliary loads 130 controlled by one or more AC auxiliary load controls 132 coupled to alternator 126. In addition, auxiliary energy system 104 may include one or more DC auxiliary loads 134 controlled by one or more DC auxiliary load controls 136, which may include DC-AC inverters coupled to AC auxiliary loads. The auxiliary AC or DC loads may include, for example, an air conditioning unit, a pneumatic or other fluid compressor unit, a pump, a cooling fan, a heater, lights, and other electrical loads separate from the traction system. In one embodiment, heat engine 124 and alternator 126 may be sized to handle the maximum load required to operate all attached loads.

Generally, in a cruising mode of operation, bi-directional boost converter 112 acts to boost the voltage provided by the low voltage side 138 of energy system 102 to the high voltage side 140 of energy system 102. That is, voltage from first energy storage device 108 is provided to bi-directional boost converter 112 via a bus 142 coupled to a first channel (a) thereof on the low voltage side 138 of energy system 102. The provided voltage is boosted by bi-directional boost converter 112 such that the voltage provided to DC link 114 on the high voltage side 140 of energy system 102 is increased to an operating level of electric drive 116. During an accelerating mode of operation, second energy storage device 110 assists first energy storage device 108 to provide the needed accelerating power.

Voltage and current measurements on DC link 114 are provided to vehicle system controller 106 by a voltage measurement device 144 and a current measurement device 146, respectively. The feedback of the voltage and current on DC link 114 allow vehicle system controller 106 to determine if first and second energy storage devices 108, 110 are providing the acceleration power needed by electric drive 116.

If the acceleration demand is greater than that provided by first and second energy storage devices 108, 110, vehicle system controller 106 is configured to cause channel b of bi-directional boost converter 112 to convert voltage from auxiliary energy system 104 to provide the extra acceleration power needed. Based on a feedback from AC auxiliary load controls 132 and any DC auxiliary load controls 136, vehicle system controller 106 can determine which loads 130, 134 are receiving power from alternator 126 and whether excess power is available or whether additional power from heat engine 124 and alternator 126 is needed. If a sufficient amount of excess power is available without having to shut off one or more loads 130, 134, then vehicle system controller 106 may cause bi-directional boost converter 112 to boost available voltage on bus 122 for the acceleration.

However, if vehicle system controller 106 determines that there is no excess power or that the excess power is not sufficiently high enough to provide the additional acceleration power needed, then vehicle system controller 106 is configured to turn off or reduce the power draw from one or more loads 130, 134 such that power from heat engine 124 and alternator 126 may be used to supplement the power provided by first energy storage device 108 and second energy storage device 110 for acceleration. That is, vehicle system controller 106 may control AC or DC auxiliary load controls 132, 136 such that respectively coupled loads 130, 134 draw less power from alternator 126, thus freeing that power for use in conversion and acceleration.

In another embodiment, heat engine 124 and alternator 126 may be reduced in size to handle the power requirements of less than all loads such that, together with vehicle system controller 106, the loads 130, 134 may be prioritized according to the available power from heat engine 124 and alternator 126. That is, in addition to controlling AC or DC auxiliary load controls 132, 136 during acceleration periods, vehicle system controller 106 may be configured to turn off or reduce the power draw from one or more loads 130, 134 during non-acceleration periods to take advantage of a smaller, less weight heat engine/alternator combination. In this manner, vehicle system controller 106 may constantly monitor and control load controls 132, 136 and loads 130, 134 and, when additional acceleration power is needed, activate bi-directional boost converter 112 to convert power or energy on bus 122 into additional acceleration power or energy on DC link 114.

In an embodiment of the invention, controller 106 may be configured to operate electric drive 116 in a regenerative mode, wherein electric power or energy is returned to DC link 114 through DC-AC inverter 118 during a regenerative braking event. In a first regenerative braking mode, controller 106 may cause regenerative power or energy to partially replenish second energy storage device 110 directly coupled on DC link 114 or to partially replenish first energy storage device 108 through channel a of the bidirectional boost converter 112. That is, during such a regenerative braking event, a portion of the regenerative braking power or energy can also be stored in the second energy storage device 110, and bi-directional boost converter 112 may be configured to dynamically buck the voltage provided via DC link 114 such that an optimal amount of regenerative power or energy is able to be captured and stored in first energy storage device 108. A dynamic retarder 148 coupled to DC link 114 may be also be controlled to moderate the levels of regenerative power or energy that develops on DC link 114 when electric drive 116 is operated in the regenerative mode.

In a second regenerative braking mode, controller 106 may cause regenerative power or energy to power auxiliary loads 130, 134. In addition, controller 106 may cause auxiliary loads 130, 134 to be operated with an increased power draw if excess regenerative power or energy is available. In one embodiment, controller 106 may provide power to auxiliary loads 130, 134 via bucking control of boost converter assembly 112 such that the power or energy is available on channel b of boost converter assembly 112. In event that high regenerative power is available during high power regenerative events that may exceed the power or current rating of channel b of boost converter assembly 112, a coupling device 150 may be activated to provide an alternate path such that power flow for the regenerative power may be passed from DC link 114 directly to boost converter assembly 112 to substantially power DC auxiliary controls 136 and respective DC auxiliary loads 134. Coupling device 150 could be implemented, for example, as a diode that is poled to conduct current and power flow from DC link 114 to bus 122. Alternate implementations of the coupling device 150 could also be implemented with power semiconductor device(s), including Silicon Controller Rectifiers (SCR's) or a contactor. In addition, a resistor such as a power resistor may be coupled in series with a contactor or power semiconductor device to control a voltage on low-side bus 122 when the contactor or power semiconductor device is closed coupling DC link 114 to low-side bus 122. Provided the voltage of the DC link 114 during a regenerative event exceeds the voltage of bus 122, then high efficiency power transfer results since the coupling device essentially bypasses the boost converter 112.

In addition to providing additional acceleration power or energy as described above, auxiliary energy system 104 may also be used to provide charging power or energy to re-charge first energy storage device 108 or second energy storage device 110. That is, vehicle system controller 106 may be configured to use excess power or energy supplied by alternator 126 during low power operation, for example during constant speed or cruising mode of operation, or non-propulsion moments (such as when the vehicle is stopped) to boost the excess power or energy for re-charging second energy storage device 110 via DC link 114 or for re-charging first energy storage device 108 via bucking control of channel a of bi-directional boost converter 112.

Figure 2:
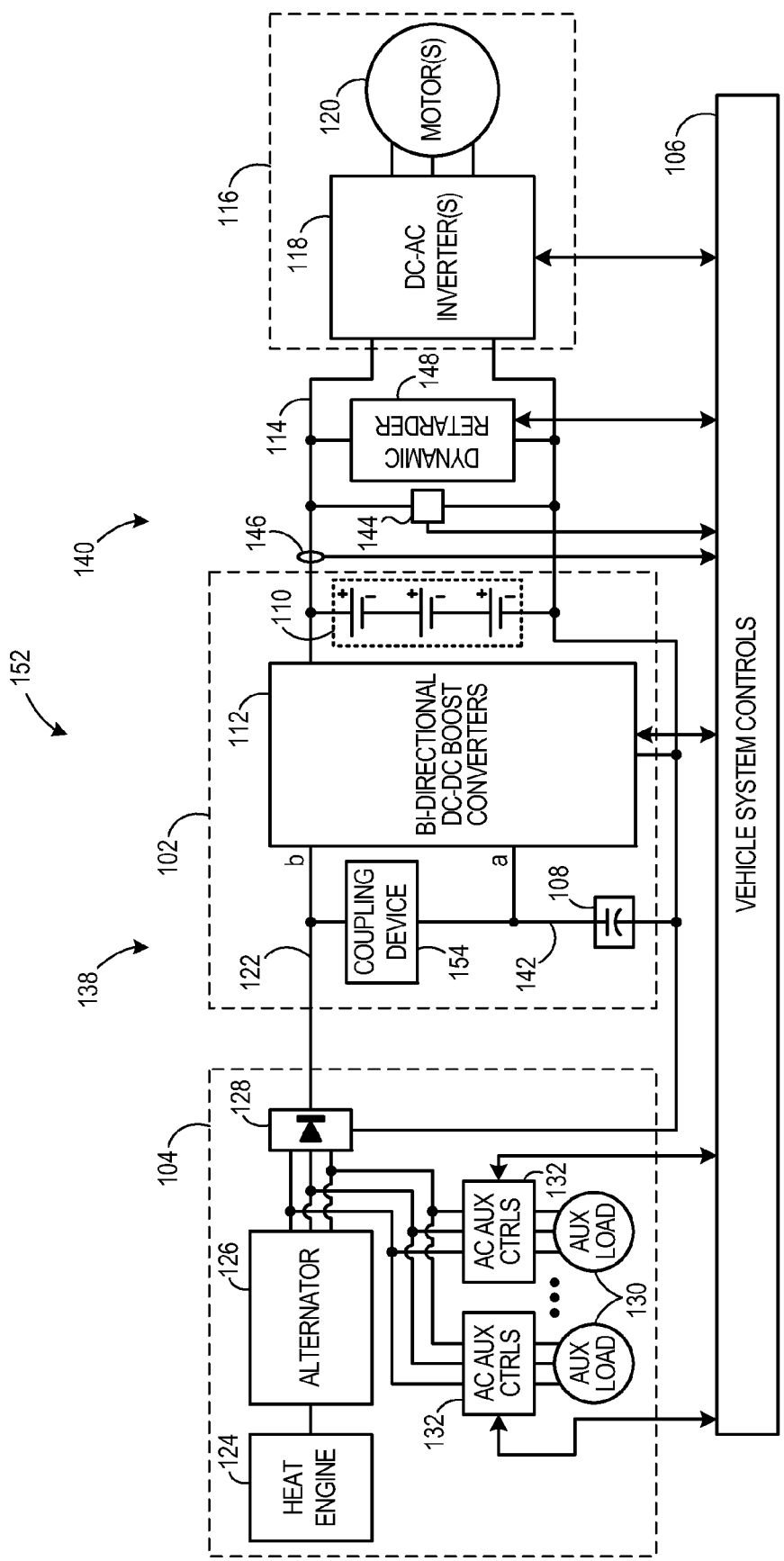
FIG. 2 schematically illustrates another embodiment of the propulsion system according to the invention.

FIG. 2 illustrates another embodiment of the invention. Propulsion system 152 shown in FIG. 2 includes components similar to components shown in system 100 of FIG. 1, and thus numbers used to indicate components in FIG. 1 will also be used to indicate similar components in FIG. 2.

In addition to the components in common with vehicle propulsion system 100, system 152 includes a coupling device 154 configured to selectively couple bus 122 to bus 142. During operation, the maximum voltage of first energy storage device 108 is greater than the nominal voltage supplied by rectifier assembly 128 to bus 122. In one embodiment, the maximum voltage of first energy storage device 108 is approximately two times the nominal voltage supplied by rectifier assembly 128; however, other values are also contemplated. During normal operation of system 152, first energy storage device 108 is configured to operate from its maximum voltage down to approximately 50% of its maximum voltage such that approximately 75% of total stored or usable power or energy within first energy storage device 108 is utilized. In event that the usable power or energy stored by first energy storage device 108 is exhausted and additional propulsion power continues to be demanded to operate the vehicle, coupling device 154 conducts such that voltage from auxiliary energy system 104 may be boosted to DC link 114 voltage using two channels (a and b) of bi-directional boost converter 112 thereby allowing approximately twice the rated power compared to a single channel of bi-directional boost converter 112 to facilitate operation of the vehicle.

In one embodiment, coupling device 154 is a diode configured to automatically couple bus 122 to bus 142 when the usable voltage of first energy storage device 108 drops below the usable voltage of rectifier assembly 128 and the drop across the diode. In another embodiment, coupling device 154 includes a voltage sensor (not shown) and a contactor (not shown). In this embodiment, when sensed voltage of first energy storage device 108 drops to or below a specified threshold, vehicle system controller 106 can cause the contactor to close, thus coupling bus 122 to bus 142.

Figure 3:
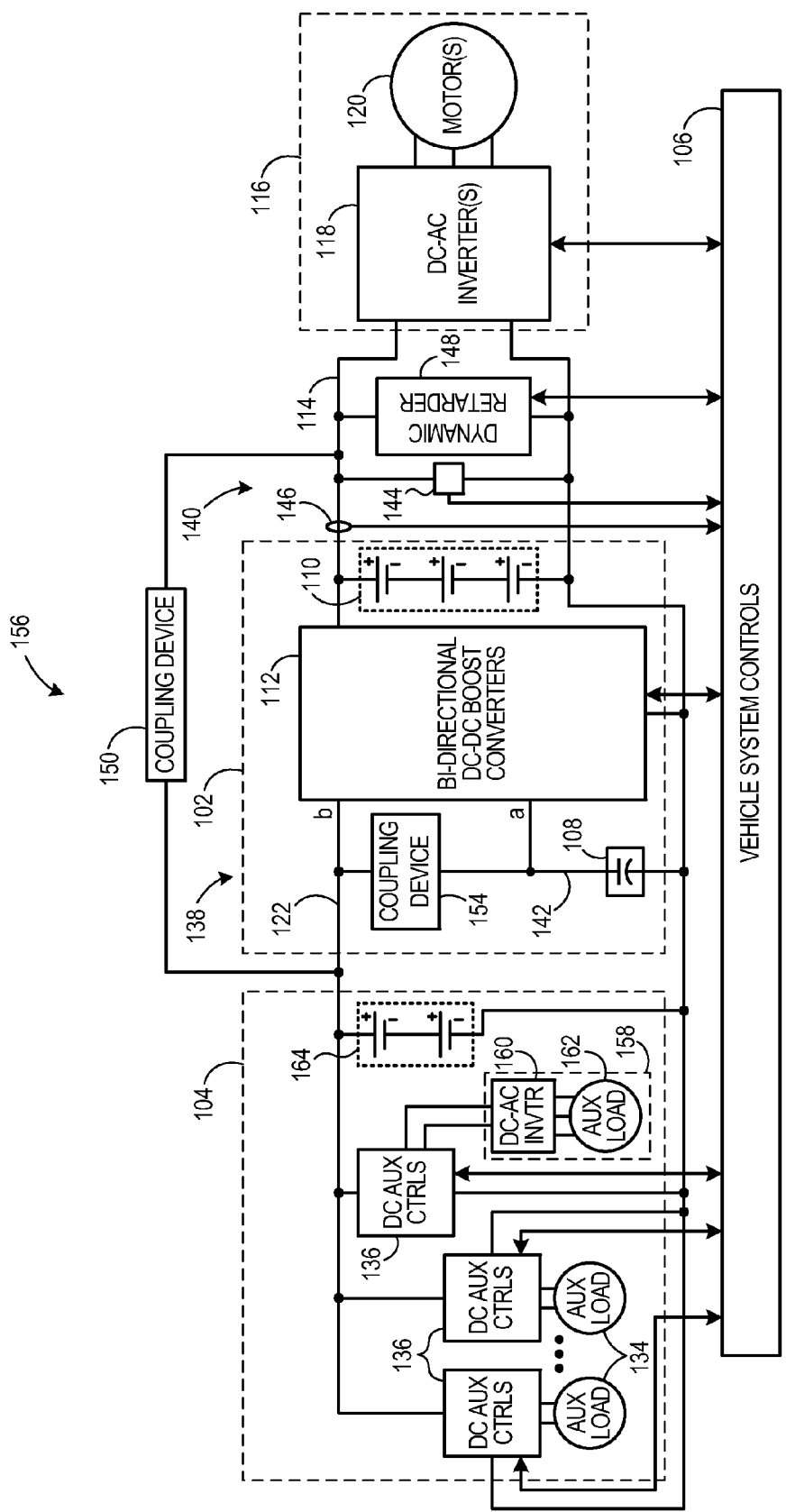
FIG. 3 schematically illustrates another embodiment of the propulsion system according to the invention.

FIG. 3 illustrates another embodiment of the invention. Propulsion system 156 shown in FIG. 3 includes components similar to components shown in FIGS. 1 and 2, and thus numbers used to indicate components in FIGS. 1 and 2 will also be used to indicate similar components in FIG. 3.

As shown, auxiliary energy system 104 is shown as a DC system having one or more DC auxiliary loads 134 with respective DC auxiliary load controls 136. As shown, one DC auxiliary load 158 may include a DC-AC inverter 160 that controls an AC load 162 such as a motor configured to operate auxiliary loads, for example, air conditioning compressors, air compressors, cooling fan loads, and the like. A DC energy storage device 164, illustrated as a battery, is configured to supply DC power or energy to power loads 134 and controls 136. While DC energy storage device 164 is illustrated as a battery, other types of energy storage devices such as an ultracapacitor, a fuel cell, a flywheel, or the like are also contemplated.

In this embodiment, vehicle system controller 106 is configured to operate in a similar manner as described above. That is, vehicle system controller 106 may control the power or energy needed for loads 134 during acceleration or non-acceleration periods of system 156. During acceleration demands, if excess power or energy from DC energy storage device 164 is not adequately available, vehicle system controller 106 may cause one or more loads 134 to shut off or to have a reduced power supplied thereto such that power or energy from DC energy storage device 164 may be boosted via channel b of bi-directional boost converter 112 for assistance during the acceleration period. Thus, the load power or energy supplied to loads 134 may be reduced from a first power or energy value to a second power or energy value. The second power or energy value may be zero in the case of reducing the load power or energy to the point of shutting off the load 134. Also, as described above with respect to providing re-charging power or energy, auxiliary energy system 104 of vehicle propulsion system 156 may also be controlled by vehicle system controller 106 to provide power or energy for re-charging first energy storage device 108 or second energy storage device 110 via bi-directional boost converter 112.

Propulsion system 156 may also include coupling device 150. As described above, in a first regenerative braking mode, controller 106 may cause regenerative power or energy to partially replenish second energy storage device 110 directly coupled on DC link 114 or to partially replenish first energy storage device 108 through channel a of the bidirectional boost converter 112. In addition, in a second regenerative braking mode, controller 106 may cause regenerative power or energy to power auxiliary loads 134, 158. The supply of power or energy to low-side bus 122 for auxiliary loads 134, 158 may occur via bucking control of boost converter assembly 112 such that the power or energy is available on channel b of boost converter assembly 112 or via a direct supply from DC link 114 via coupling device 150.

When high power regenerative power is transferred to low-side bus 122 via coupling device 150, it can be captured in the relatively large energy and power rated energy storage device 164 as well as being supplied to auxiliary loads 134, 158. In this manner, regenerative power can avoid being lost or dissipated as heat in dynamic retarder 148, and the capture of the regenerative power in DC energy storage device 164 allows an increased operating range of the of propulsion system 156 in a vehicle application.

Also as described above, in event that the usable power or energy stored by first energy storage device 108 is exhausted and additional propulsion power continues to be demanded to operate the vehicle, coupling device 154 is activated to couple bus 122 to bus 142 such that voltage from DC energy storage device 164 may be boosted to DC link 114 voltage using two channels (a and b) of bi-directional boost converter 112 thereby allowing approximately twice the rated power compared to a single channel of bi-directional boost converter 112 to facilitate operation of the vehicle.

Figure 4:
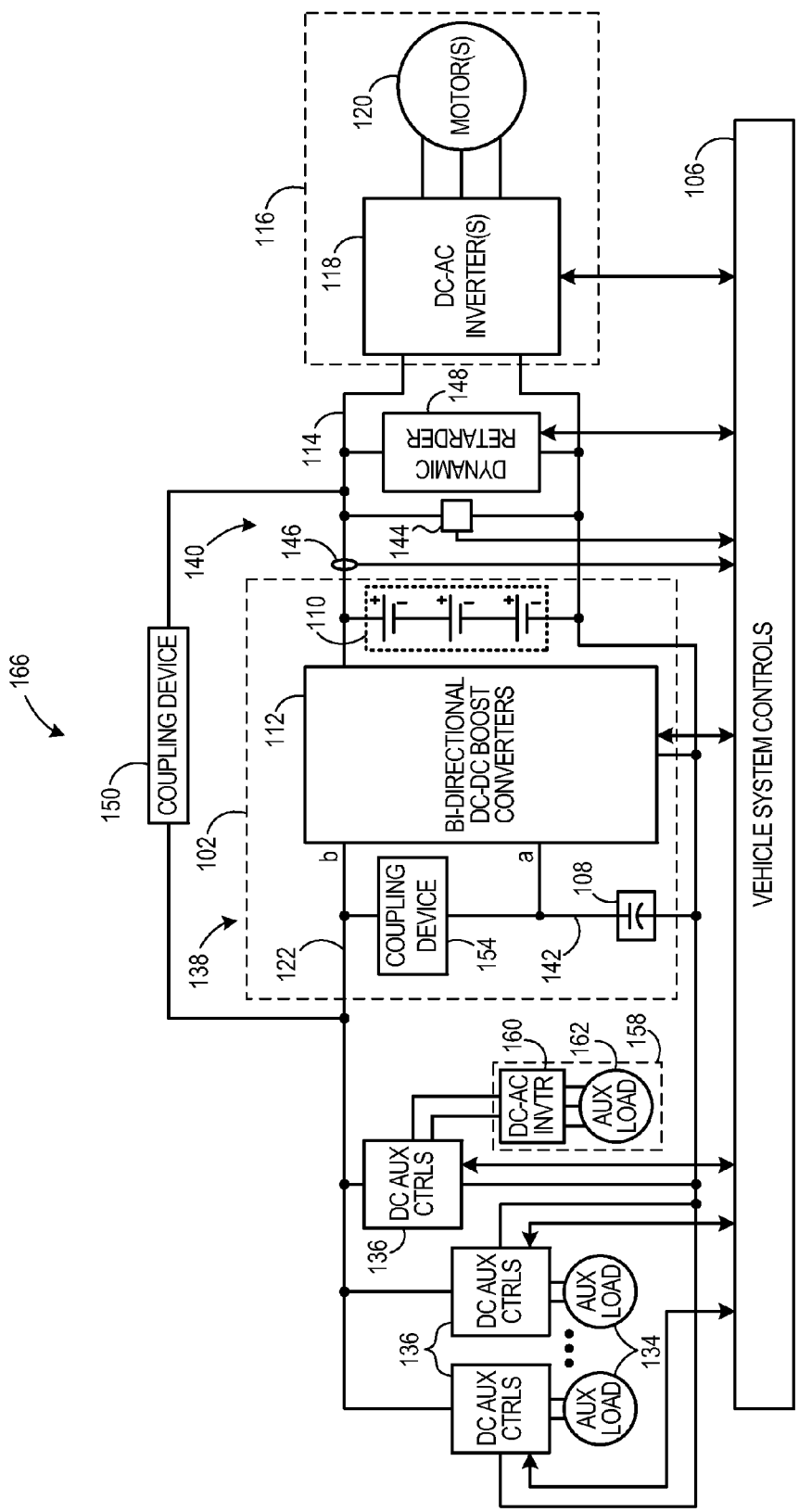
FIG. 4 schematically illustrates another embodiment of the propulsion system according to the invention.

FIG. 4 illustrates another embodiment of the invention. Propulsion system 166 shown in FIG. 4 includes components similar to components shown in FIGS. 1-3, and thus numbers used to indicate components in FIGS. 1-3 will also be used to indicate similar components in FIG. 4.

As illustrated, a separate auxiliary power source (such as DC energy storage device 164 shown in FIG. 3) is not included in propulsion system 166. Thus, propulsion system 166 operates as a single, high-specific power battery 110 is provided. Battery 110 is sized to provide power or energy for electric drive 116 and DC auxiliary loads and controls 134, 136, 162. As such, the power or energy used by DC auxiliary loads and controls 134, 136 may be supplied to channel b of boost converter assembly 112 via bucking control of the voltage on DC link 114 from battery 110.

As described above, if excess power is needed during, for example, an acceleration demand from electric drive 116, vehicle system controller 106 may cause the power draw from one or more loads 134, 162 to be reduced or shut off so that such excess power may be delivered to electric drive 116 from battery 110.

During periods when regenerative power may be used from electric drive 116, coupling device 150 may be caused to couple DC link 114 with low-side bus 122 such that the regenerative power may directly supply power to DC auxiliary loads and controls 134, 136, 162. In addition, coupling device 154 may also cause power on low-side bus 122 to be supplied to bus 142 for re-charging first energy storage device 108 during such regenerative power periods.

Figure 5:
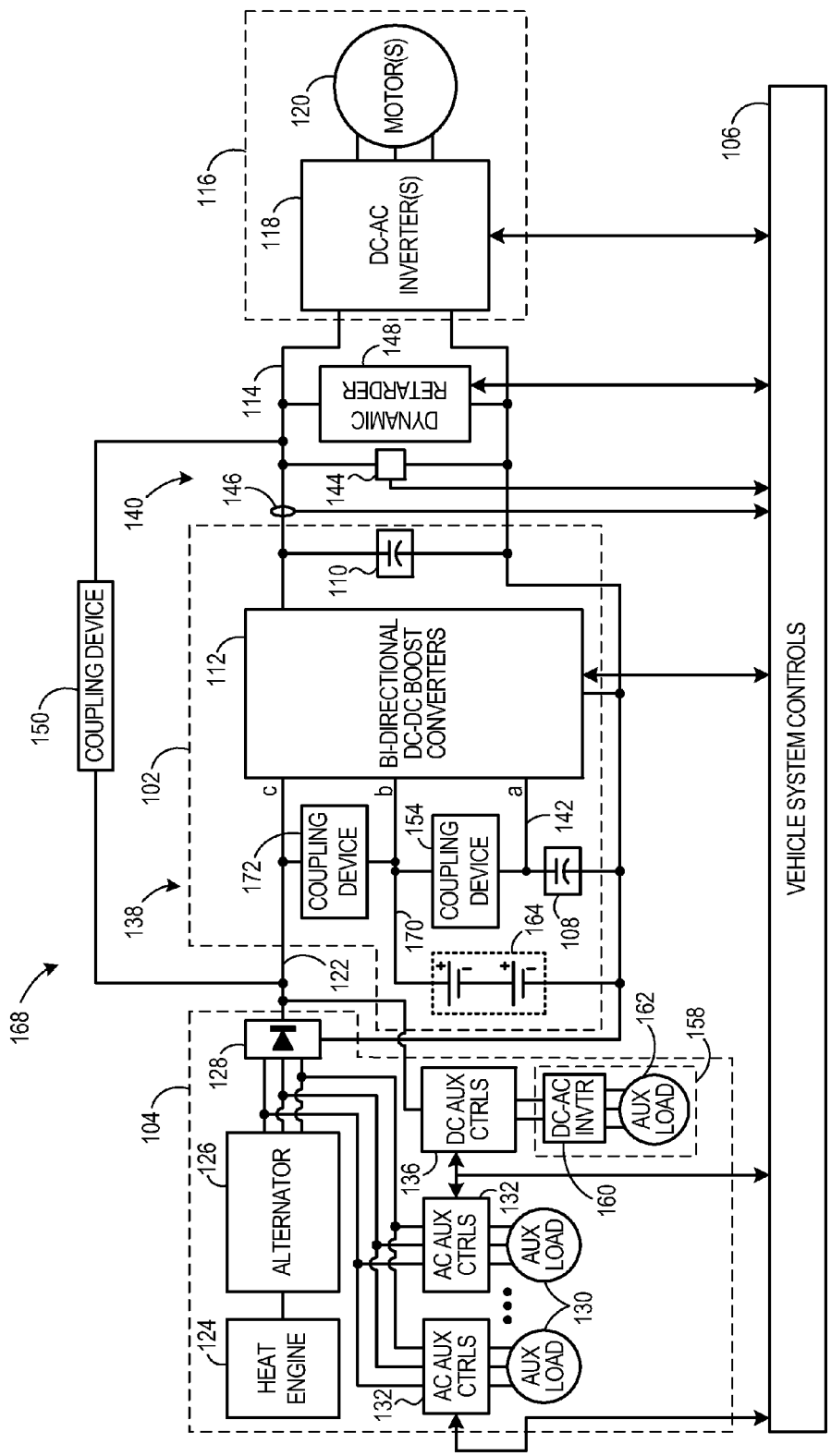
FIG. 5 schematically illustrates another embodiment of the propulsion system according to the invention.

FIG. 5 illustrates another embodiment of the invention. Propulsion system 168 shown in FIG. 5 includes components similar to components shown in FIGS. 1-4, and thus numbers used to indicate components in FIGS. 1-4 will also be used to indicate similar components in FIG. 5.

As shown, auxiliary energy system 104 includes heat engine 124, alternator 126, rectifier assembly 128, and AC auxiliary loads and controls 130, 132. Vehicle propulsion system 168 includes DC energy storage device 164; however, in this embodiment, DC energy storage device 164 is used as a part of energy system 102 to assist first energy storage device 108 in providing propulsion power or energy to propel the vehicle. DC energy storage device 164 is preferably a high specific-energy battery.

In the embodiment shown in FIG. 5, the maximum voltage of first energy storage device 108 is greater than the nominal voltage supplied by DC energy storage device 164 to a bus 170 coupled to channel b of bi-directional boost converter 112 and greater than the nominal voltage supplied by rectifier assembly 128 to bus 122. In addition, the maximum voltage of DC energy storage device 164 greater than the nominal voltage supplied by rectifier assembly 128 to bus 122. In event that the usable energy stored by first energy storage device 108 is exhausted and additional propulsion power continues to be demanded to operate the vehicle, coupling device 154 conducts such that voltage from DC energy storage device 164 may be boosted to DC link 114 voltage using two channels (a and b) of bi-directional boost converter 112 thereby allowing approximately twice the rated power compared to a single channel of bi-directional boost converter 112 to facilitate operation of the vehicle. Further, in event that the usable energy stored by DC energy storage device 164 is also exhausted and additional propulsion power continues to be demanded to operate the vehicle, another coupling device 172 coupled between bus 170 and bus 122 conducts such that voltage from DC energy storage device 164 may be boosted to DC link 114 voltage using three channels (a, b, and c) of bi-directional boost converter 112 thereby allowing approximately three times the rated power compared to a single channel of bi-directional boost converter 112 to facilitate operation of the vehicle.

It is noted that while first and second energy storage devices 108, 110 are illustrated as ultracapacitors and DC energy storage device 164 is illustrated as a battery, other combinations of energy storage devices are contemplated.

Figure 6:
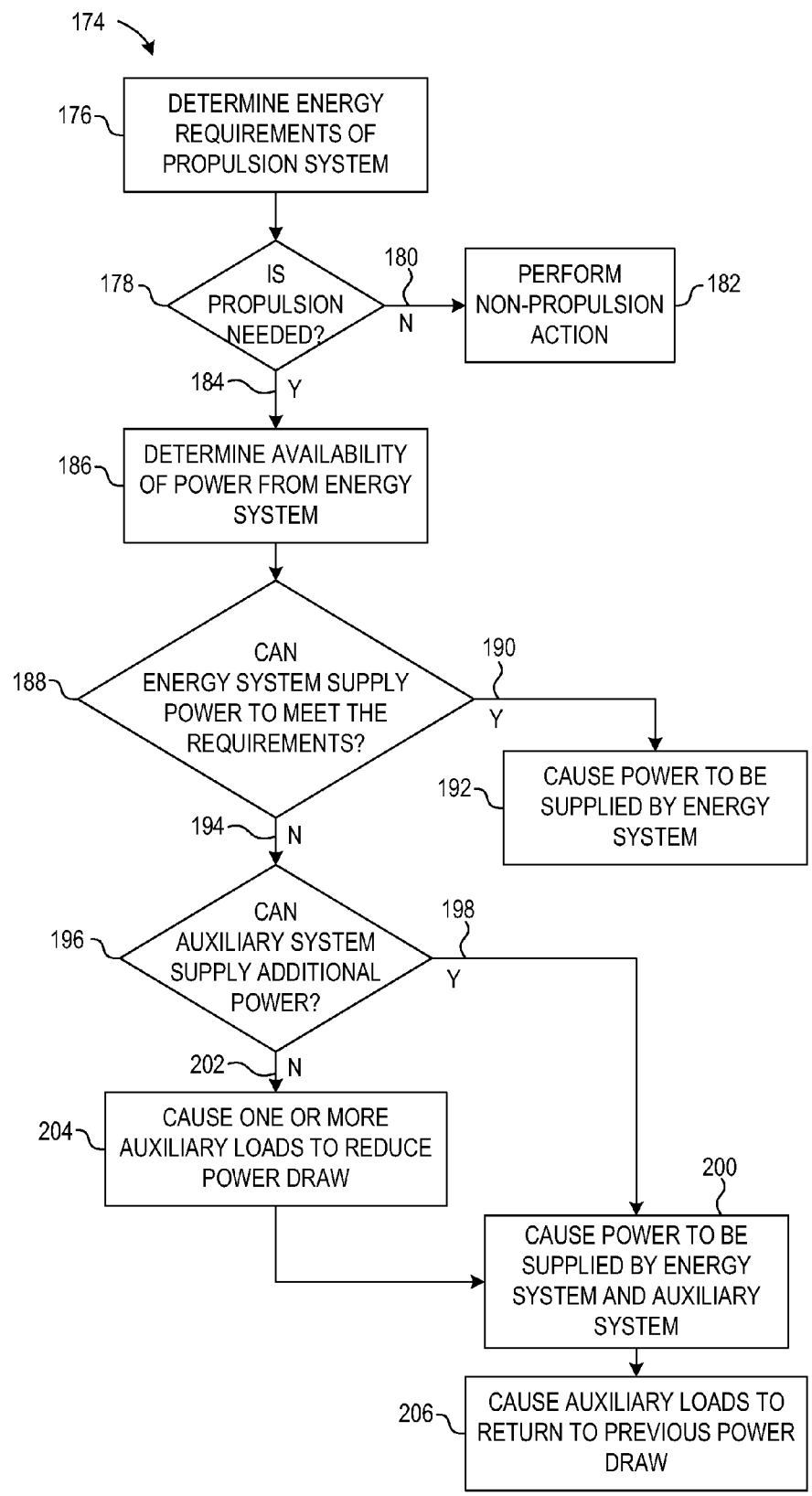
FIG. 6 is a flow chart illustrating procedure steps of the system controller according to an embodiment of the invention.

Referring now to FIG. 6, a flowchart 174 describing an operation of the vehicle system controller 106 according to an embodiment of the invention is shown. At step 176, the vehicle system controller determines the power or energy requirements needed by the propulsion system to propel the vehicle. For example, it may be determined that the vehicle is in a cruising mode of propulsion, in an acceleration mode of propulsion, in a mode of no propulsion such as when the vehicle is stopped, or in a mode of deceleration. At step 178, the vehicle system controller determines is propulsion is needed. If not 180, then a non-propulsion action may be performed at step 182 such as regenerative braking power or energy capture or the re-charging of energy storage devices via the auxiliary system.

If the vehicle system controller similarly determines 184 that propulsion is needed, the availability of the power or energy needed for the propulsion from an energy system is determined at step 186. The energy system includes a first energy storage device coupled to a low-side of a bi-directional boost converter. A second energy storage device may be coupled to a high-side of the bi-directional boost converter. The availability of power or energy may be determined from feedback information from a DC link supplying power or energy to an electric motor. The feedback may be provided by a current and/or voltage sensor. Based on the feedback information, a capability of at least the first energy storage device to supply desired power or energy may be determined. At step 188, it is determined if the energy system is capable of meeting the propulsion requirements. If the energy system has enough power or energy to supply the needed propulsion power or energy 190, then the vehicle system controller causes the energy system to supply the power or energy at step 192. If not 194, then the vehicle system controller determines whether excess power is available from an auxiliary system at step 196. An amount of additional power or energy needed may be determined from a difference between the power or energy needed by the propulsion requirement and the power or energy capable of being supplied by the first and/or second energy storage devices.

If excess power or energy greater than the difference is available 198, then the vehicle system controller causes both the energy system and the auxiliary system to supply the needed propulsion power or energy at step 200. If excess power or energy is not available or is less than the difference 202, then the vehicle system controller causes one or more auxiliary loads to reduce the demand for power or energy from the auxiliary system step 204. The reduction in demand for power or energy is at least equal to the amount of power or energy determined from the difference between the power or energy needed by the propulsion requirement and the power or energy capable of being supplied by the first and/or second energy storage devices. The vehicle system controller may prioritize the auxiliary loads to shut off or reduce the power or energy drawn for loads. The prioritization may begin with lesser needed loads and end with important loads. As an example, the vehicle system controller may temporarily shut off an air conditioning load during a vehicle acceleration to make additional auxiliary power or energy available for assisting the energy system in supplying the needed propulsion power or energy. Shutting off the air conditioning load may even be unnoticed by the vehicle operator. Another example includes shutting off a compressor of a pneumatic kneeling system until the power or energy from the auxiliary system is no longer needed for propulsion. Other systems capable of being shut off or reduced are also contemplated.

At step 206, any loads previously shut off or reduced may be returned to their original state once the reason for their power or energy draw reduction (e.g., such as during an acceleration mode) is ended. That is, the load power or energy previously reduced from a first power or energy value to a second, lower power or energy value may be returned back to the pre-reduction, first power or energy value state or to a different power or energy value state.

One skilled in the art will appreciate vehicle system controller 106 may be implemented via a plurality of components such as one or more of electronic components, hardware components, and/or computer software components. These components may include one or more tangible computer readable storage media that generally stores instructions such as software, firmware and/or assembly language for performing one or more portions of one or more implementations or embodiments. Examples of a tangible computer readable storage medium include a recordable data storage medium and/or mass storage device. Such tangible computer readable storage medium may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of tangible computer readable storage media not listed may be employed with embodiments of the invention.

A number of such components can be combined or divided in an implementation of the systems described herein. Further, such components may include a set and/or series of computer instructions written in or implemented with any of a number of programming languages, as will be appreciated by those skilled in the art.

A technical contribution for the disclosed method and apparatus provides for a computer-implemented device capable of providing propulsion power from an auxiliary drive of a vehicle or non-vehicle system.

Therefore, according to an embodiment of the invention, a propulsion system includes an energy system, an auxiliary system, and a system controller. The energy system includes a bi-directional boost converter coupled to a direct current (DC) link, the bi-directional boost converter comprising a plurality of input channels. The energy system also includes a first energy storage device coupled to a first input channel of the bi-directional boost converter via a DC bus. The auxiliary system is coupled to the energy system and includes an auxiliary energy source, an auxiliary load, and an auxiliary load controller coupled to the auxiliary energy source and to the auxiliary load. The system controller is configured to cause the auxiliary load controller to reduce a power draw of the auxiliary load from the auxiliary energy source and to cause the bi-directional boost converter to boost a voltage supplied by the auxiliary energy source and to supply the boosted voltage to the DC link.

According to another embodiment of the invention, a method of assembling a propulsion energy system includes coupling an energy system to a direct current (DC) link, the energy system including a multi-channel bi-directional boost converter coupled to the DC link and an energy storage device coupled to a first input channel of the bi-directional boost converter via a DC bus. The method also includes coupling an auxiliary system to the energy system that includes an energy source, a load controller coupled to the energy source, and a load coupled to the load controller. The method also includes coupling a controller to the energy system and to the auxiliary system and configuring the controller to cause a reduction in power draw of the load of the auxiliary system from the energy source of the auxiliary system and to cause the DC link to receive a boosted voltage from the multi-channel bi-directional boost converter based on the reduction in power draw.

According to yet another embodiment of the invention, a vehicle system includes a direct current (DC) energy storage device coupled to a first channel of a bi-directional DC-DC boost converter, and an auxiliary energy source coupled to a first load controller and to a second channel of the bi-directional DC-DC boost converter. The vehicle system also includes a first auxiliary load coupled to the first load controller and a vehicle system controller. The vehicle system controller is programmed to reduce a load energy supplied by the auxiliary energy source to the first auxiliary load from a first energy value to a second energy value and to boost at least a portion of the reduced energy via the bi-directional DC-DC boost converter for supply thereof to a DC link.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A propulsion system comprising:
an energy system for supplying power to an electric drive, the energy system comprising:
a bi-directional boost converter coupled to a direct current (DC) link, the bi-directional boost converter comprising a plurality of input channels; and
a first energy storage device coupled to a first input channel of the bi-directional boost converter via a DC bus;

an auxiliary system coupled to the energy system, the auxiliary system comprising:
an auxiliary energy source;
an auxiliary load; and
an auxiliary load controller coupled to the auxiliary energy source and to the auxiliary load; and
a system controller configured to:
determine an amount of propulsion power desired to be supplied to the electric drive;
receive feedback information of the DC link from one of a current sensor and a voltage sensor;
determine, based on the feedback information, a capability of the first energy storage device to supply the amount of propulsion power to the DC link;
determine a power difference between the amount of propulsion power desired to be supplied to the electric drive and an amount of power capable of being supplied by the first energy storage device;
cause the auxiliary load controller to reduce a power draw of the auxiliary load from the auxiliary energy source by at least an amount equal to the power difference; and
cause the bi-directional boost converter to boost a voltage supplied by the auxiliary energy source based on the reduction in power draw and to supply the boosted voltage to the DC link.

2. The propulsion system of claim 1 wherein the system controller is configured to cause the auxiliary load controller to stop the power draw of the auxiliary load from the auxiliary energy source.

3. The propulsion system of claim 1 wherein the auxiliary energy source comprises:
an internal combustion engine;
an alternator coupled to the internal combustion engine; and
a rectifier coupled to the alternator and to a second input channel the bi-directional boost converter.

4. The propulsion system of claim 3 wherein the auxiliary load comprises an alternating current (AC) load coupled to receive AC energy from the alternator.

5. The propulsion system of claim 3 wherein the auxiliary load comprises a DC load coupled to receive DC energy from the rectifier.

6. The propulsion system of claim 5 wherein the DC load comprises a DC-AC inverter coupled to an AC load.

7. The propulsion system of claim 1 wherein the auxiliary energy source comprises a second energy storage device coupled to a second input channel the bi-directional boost converter; and
wherein the auxiliary load comprises a DC load coupled to receive DC energy from the second energy storage device.

8. The propulsion system of claim 1 further comprising a coupling device coupled to the DC link and to the auxiliary system; and
wherein the system controller is configured to control the coupling device to selectively couple the DC link to the auxiliary system to cause a transfer of power from the DC link to the auxiliary system to bypass the bi-directional boost converter.

9. The propulsion system of claim 8 wherein the coupling device comprises:
one of a power semiconductor device and a contactor; and
a resistor.

10. The propulsion system of claim 1 wherein the energy system further comprises a first coupling device configured to selectively couple the auxiliary system to the first input channel.

11. The propulsion system of claim 10 wherein the auxiliary system is coupled to a second input channel of the bi-directional boost converter; and
wherein the energy system further comprises:
a second energy storage device coupled to a third input channel of the bi-directional boost converter; and
a second coupling device configured to selectively couple the first input channel to the third input channel.

12. The propulsion system of claim 1 wherein the first energy storage device comprises one of a battery, an ultracapacitor, and a flywheel.

13. A method of assembling a propulsion energy system, the method comprising:
coupling an energy system to a direct current (DC) link, the energy system comprising:
a multi-channel bi-directional boost converter coupled to the DC link; and
an energy storage device coupled to a first input channel of the bi-directional boost converter via a DC link;
coupling an auxiliary system to the energy system, the auxiliary system comprising:
an energy source;
a load controller coupled to the energy source; and
a load coupled to the load controller;
coupling a motor to the DC link;
coupling a controller to the energy system and to the auxiliary system; and
configuring the controller to:
determine an amount of additional power needed by the energy system, beyond that available by the energy system, to supply a desired power to the motor;
cause a reduction in power draw of the load of the auxiliary system from the energy source of the auxiliary system based on the amount of additional power needed by the energy system; and
cause the DC link to receive a boosted voltage from the multi-channel bi-directional boost converter based on the reduction in power draw.

14. The method of claim 13 configuring the controller comprises configuring the controller to cause the load controller to halt all power draw by the load.

15. The method of claim 13 wherein the energy source of the auxiliary system comprises a heat engine.

16. A vehicle system comprising:
a direct current (DC) energy storage device coupled to a first channel of a bi-directional DC-DC boost converter;
an auxiliary energy source coupled to a first load controller and to a second channel of the bi-directional DC-DC boost converter;
a first auxiliary load coupled to the first load controller, the first auxiliary load comprising a non-rechargeable device; and
a vehicle system controller programmed to:
reduce a load energy supplied by the auxiliary energy source to the first auxiliary load from a first energy value to a second energy value; and
boost at least a portion of the reduced energy via the bi-directional DC-DC boost converter for supply thereof to a DC link.

17. The vehicle system of claim 16 wherein the vehicle system controller is further programmed to:
   reduce a load energy supplied by the auxiliary energy source during an acceleration mode; and
   return the load energy supplied by the auxiliary energy source to the first energy value following the acceleration mode.

18. The vehicle system of claim 16 wherein the auxiliary energy source comprises a heat engine coupled to an alternator; and
   wherein the first auxiliary load comprises an alternating current (AC) load coupled to receive AC energy from the alternator.

19. The vehicle system of claim 16 further comprising:
   a second load controller coupled to the auxiliary energy source;
   a second auxiliary load coupled to the second load controller; and
   wherein the vehicle system controller is further programmed to:
      prioritize reduction of load energy such that a reduction of load energy supplied by the auxiliary energy source to the first auxiliary load occurs prior to a reduction of load energy supplied by the auxiliary energy source to the second auxiliary load.

20. The vehicle system of claim 16 further comprising a coupling device configured to couple energy supplied by the auxiliary energy source to energy supplied by the DC energy storage device.

21. The vehicle system of claim 16 wherein, in reducing the load energy supplied by the auxiliary energy source to the first auxiliary load from the first energy value to the second energy value, the vehicle system controller is further programmed to reduce the load energy supplied by the auxiliary energy source to the first auxiliary load by an amount equal to an amount of additional power needed by the DC bus, beyond that available by the DC energy storage device, to supply a desired power to a motor connected to the DC bus.

* * * * *